(12) United States Patent
Megaro

(10) Patent No.: US 8,584,461 B2
(45) Date of Patent: Nov. 19, 2013

(54) WATER PISTON ENGINE

(76) Inventor: Anthony T. Megaro, Parsippany, NJ (US)

(*) Notice: Subject to any disclaimer, the term of this patent is extended or adjusted under 35 U.S.C. 154(b) by 566 days.

(21) Appl. No.: 12/834,935

(22) Filed: Jul. 13, 2010

(65) Prior Publication Data
US 2011/0011086 A1  Jan. 20, 2011

(51) Int. Cl.
F03B 17/06 (2006.01)
(52) U.S. Cl.
USPC .......................................... 60/640
(58) Field of Classification Search
USPC ............. 60/639, 640, 641.3; 222/381, 383.3
See application file for complete search history.

(56) References Cited

U.S. PATENT DOCUMENTS

| | | | |
|---|---|---|---|
| 3,857,242 A | 12/1974 | Gilmore | |
| 3,934,964 A | 1/1976 | Diamond | |
| 4,282,444 A | 8/1981 | Ramer | |
| 4,310,769 A | 1/1982 | Mazzone et al. | |
| 4,324,099 A * | 4/1982 | Palomer | 60/497 |
| 4,404,801 A | 9/1983 | Palm | |
| 4,407,130 A | 10/1983 | Jackson | |
| 4,583,368 A * | 4/1986 | Neuenschwander | 60/639 |
| 4,599,857 A | 7/1986 | Kim | |
| 4,674,281 A * | 6/1987 | Kim et al. | 60/496 |
| 5,944,480 A | 8/1999 | Forrest | |
| 6,249,057 B1 | 6/2001 | Lehet | |
| 6,355,988 B1 | 3/2002 | Maple | |
| 6,445,078 B1 | 9/2002 | Cieslak, Jr. | |
| 6,945,042 B1 | 9/2005 | Walckner | |
| 2004/0108731 A1 | 6/2004 | Desy et al. | |
| 2005/0052028 A1 | 3/2005 | Chiang | |
| 2006/0130475 A1 | 6/2006 | Yu | |
| 2006/0272327 A1 | 12/2006 | Souris et al. | |
| 2007/0000246 A1 | 1/2007 | Prastitis | |
| 2008/0197637 A1 | 8/2008 | Dos Santos | |
| 2009/0158729 A1 | 6/2009 | Hatzilakos | |

FOREIGN PATENT DOCUMENTS

WO   WO 97/21922   6/1997

OTHER PUBLICATIONS

PCT International Preliminary Report on Patentability; PCT/US2010/041762; Jan. 26, 2012.

\* cited by examiner

*Primary Examiner* — Kenneth Bomberg
*Assistant Examiner* — Shafiq Mian
(74) *Attorney, Agent, or Firm* — Gearhart Law, LLC

(57) ABSTRACT

The present invention relates to an apparatus, suitable for generating energy in an aquatic environment. A preferred embodiment has at least two water piston assemblies connected to a power transfer system, such as a crankshaft or a rack and pinion drive. Each water piston assembly has a water container that slides within a casing. The casing controls the presence of water within the piston assemblies though a system of doors that opens and closes to assist with water intake and expulsion within the water container. Furthermore, the water container has ports which allow water to drain from the water container onto a water exit assembly. The water is then preferably channeled toward a generator or a turbine that converts the kinetic energy of the water flow into an electrical energy.

10 Claims, 8 Drawing Sheets

WATER PISTON ENGINE

CLAIM OF PRIORITY

This application claims the priority of U.S. Ser. No. 61/270,983 filed on Jul. 15, 2009, the contents of which are fully incorporated herein by reference.

FIELD OF THE INVENTION

The invention relates to a device capable of generating energy by transferring a quantity of water between chambers with a reciprocating motion piston device.

BACKGROUND OF THE INVENTION

The invention relates to a device capable of harnessing hydropower and gravity to drive a power transfer system. The flow of water is then channeled through the device which will spin an axis connected to a turbine, or directly to a generator, to convert the kinetic energy of the moving water into electric energy. Hydropower is the most abundant and oldest known source of renewable energy in the world and experiencing resurgence in popularity as humanity struggles to find alternative sources of energy.

The most prevalent contemporary use of hydropower today is in the production of electricity. The present invention is a novel improvement in this field of art, as it presents a device capable of channeling water from a water container or piston into a shoot or piston cylinder that is connected to a pinion drive or a crankshaft, which are then connected to a generator or a turbine. The water itself is channeled away from the invention into another body of water or into drainage.

There are many advantages to hydroelectric power, some have already been mentioned. It is abundant and relatively easy to tap. However, the present means to generate hydroelectric power also have many disadvantages. Most of the negative impact is attributed to dams. Reservoirs associated with large dams can cover dry land and river habitat with water, drastically alter appearance of a landscape, decimate native ecosystems and displace human populations. Naturally, dams have had a particular negative impact on fish species that need to continue using the now dammed body of water for breeding, feeding and other migratory activity. Additionally, the stagnant water attributed to reservoirs contributes to the spread of undesirable algae infestation and to growth of a variety of aquatic vegetation that was previously not existent.

A number of devices were introduced in the past to resolve the problems associated with large scale damming. However, these devices introduce a number of problems of their own. Overall, these tend to be overly intricate and difficult to implement, requiring complex and expensive setups. These replacement devices do not necessarily prevent damage to the environment and otherwise tend to be extremely bulky and intrusive. On the contrary, the present invention is located toward the bottom of a water filled chamber, with the rest of the assembly located beneath the floor of the chamber. Also unlike existing devices, the present invention may be driven solely on the weight of the water and on natural force of gravity. Additionally, the present invention is very scalable and is effective in small and large embodiments.

DESCRIPTION OF THE RELATED ART

U.S. Pat. No. 4,599,857 discloses The present invention relates to an apparatus for the generation of power and its method comprising two cylinders, and pistons disposed in the cylinders, and a lever arm containing weighted balls disposed therein and connected to the pistons, whereby the balls are transferred from one end portion of the lever arm to the other end portion thereof and the lever arm, moves up and down about its axis by the force of floats or pistons and the weighted balls.

U.S. Pat. No. 6,445,078 teaches a system for gravity generation of electricity which includes upper and lower water reservoirs with a conduit between the reservoirs and a pump to continuously pump water from the lower reservoir to the upper reservoir. A number of water containers are positioned side-by-side and mounted for up and down travel between the upper and lower reservoirs. When the containers have attained their upper most position at the upper reservoir, they are engaged by limit switch mechanisms to fill the containers with water from the upper reservoir. Upon being filled the containers travel by gravity to their lower most position to the lower reservoir wherein additional limit switch mechanisms are employed to drain the containers into the bottom reservoir. As the containers travel downwardly, they engage and drive an electric generator for generating large quantities of electricity. Once the containers are at their lower most position and have been fully drained they are driven back up to the upper reservoir for refill by independent geared motors.

U.S. Patent Application Publication No. 2006/0130475 discloses A power generator has a reservoir, a tube, a drive assembly, and multiple floats. The reservoir is filled with a liquid and has a top opening and a side opening. The tube protrudes into the reservoir through the side opening. The drive assembly has four pedestals, four shafts, four sprockets and a chain. The shafts are rotatably mounted respectively in the pedestals. The sprockets are mounted on and rotate the shafts. The chain is mounted around and engages the sprockets in a loop. Each float has a buoyant body and multiple annular seals. The floats are attached to the chain so at least one float is in the tube at all times and are forced up in the reservoir by buoyancy when the floats are submerged in the reservoir. The annular seals are mounted around the floats to prevent liquid from leaking out of the tube.

U.S. Patent Application Publication No. 2005/0052028 relates to a hydraulic power generation system employs a plurality of buckets carried by an endless chain to receive water falling from height and drive the chain, which in turn drives a water pumping device to raise water to the height for automatic and continuous generation of power.

Various implements are known in the art, but fail to address all the problem solved by the invention described herein. One embodiment of this invention is illustrated in the accompanying drawings and will be described in more detail herein below.

SUMMARY OF THE INVENTION

The present invention relates to an apparatus, suitable for generating energy in an aquatic environment. A preferred embodiment has at least two water piston assemblies connected to a power transfer system, such as a crankshaft or a rack and pinion drive. Each water piston assembly has a water container that slides within a casing. The casing controls the presence of water within the piston assemblies through a system of doors or valves that open and close to assist with water intake and expulsion within the water container. Furthermore, the water container or cylinder has ports which allow water to drain into a water exit assembly. These ports are preferably lined-up in such a way that the only time the water can exit is when the water container is at the bottom of its stroke or bottom dead center. The water may then be channeled toward a generator or a turbine that converts the kinetic energy of the water flow into an electrical energy. This conversion may take place instead of, or in addition to, the electrical energy generation that is likely to be produced by the spinning components of a power transfer system of the present invention. The water may also simply flow away from the device.

It is an object of the present invention to provide an apparatus for generating energy in an aquatic environment.

It is another object of the present invention to provide an apparatus that harnesses hydro power coupled with the earth's force of gravity.

Yet another object of the present invention is to provide an apparatus that is simple and relatively inexpensive to implement.

Still another object of the present invention is to provide an apparatus that has limited impact on the environment Still another object of the present invention is to provide an apparatus that is capable of sustain sufficient water flow to power mechanical components that drive a turbine or a generator.

Yet another object of the present invention is to provide an apparatus that limits waste of kinetic energy by avoiding overflow and spillage associated with traditional paddle wheel devices.

Still another object of the present invention is to provide an apparatus that is able to provide a controllable flow of water.

Yet another object of the present invention is to provide an apparatus needing little maintenance, due to the small number of moving parts.

DESCRIPTION OF THE PREFERRED EMBODIMENTS

Figure 1:
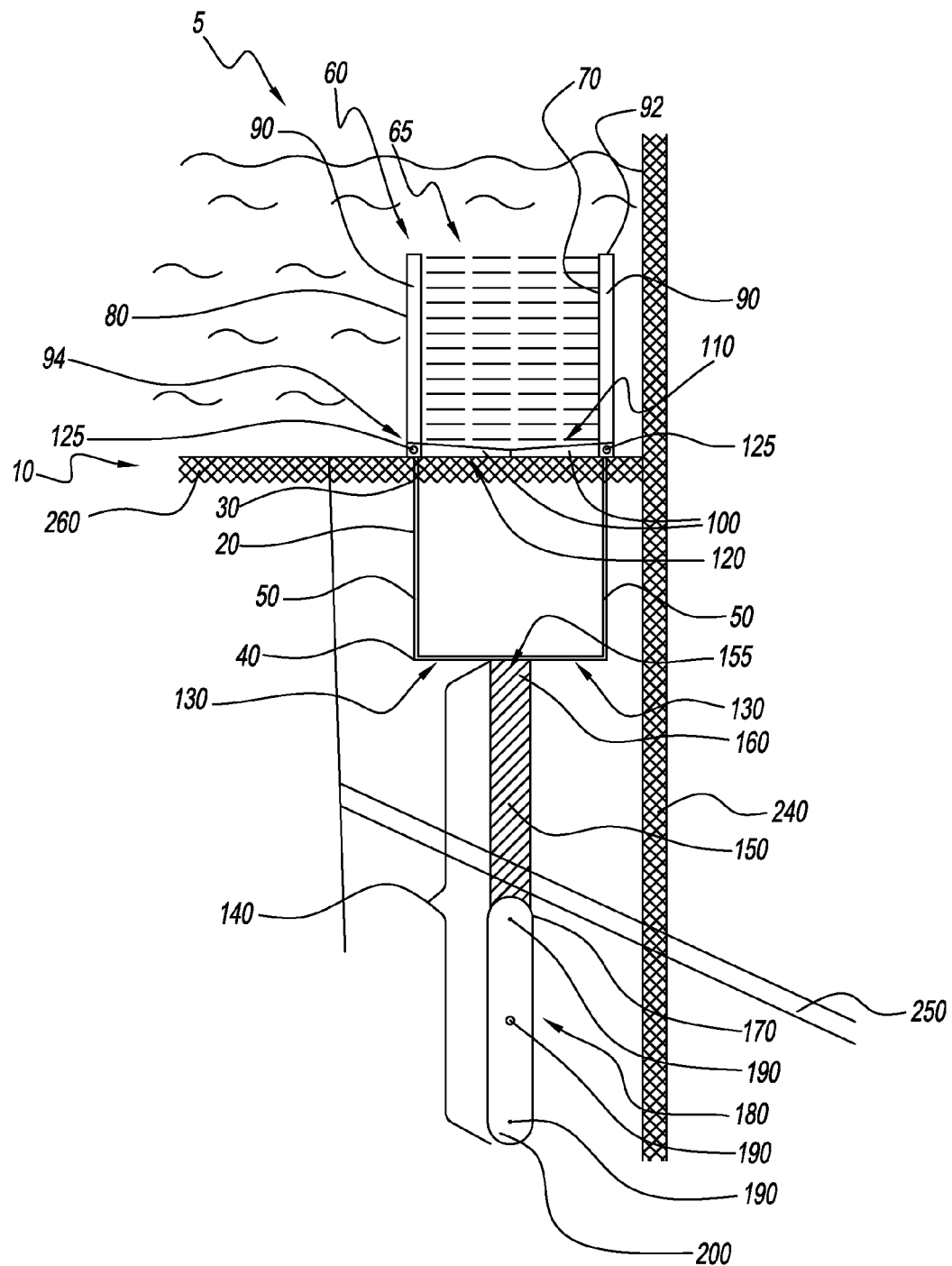
FIG. 1 shows a side view of the preferred embodiment of the present invention with the water container in a dead center low position.

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 presents a side view of the preferred embodiment of the present invention that is installed in a preferred location. Shown are a reservoir 5, a water piston assembly 10, a water container 20, a container top 30, a container bottom 40, a sidewall 50, a casing 60, a piston opening 65, an inner wall 70, an outer wall 80, a hollow space 90, a casing bottom 92, a casing top 94, doors 100, an upper surface of the doors 110, a lower surface of the doors 120, exit ports 130, a power transfer system 140, a connecting rod 150, a pivot 155, a first end 160, a second end 170, a crank shaft 180, crankpin 190, main shaft 195, crank rod 200, a retaining wall 240, a water exit assembly 250, and a base 260.

The reservoir 5 is preferably between 15 and 20 feet deep between the surface of the water and the casing top 94, which is the entry point for the water. However, as long as the water level is above the piston opening 65, it will probably not matter how much higher the water is. Alternatively, the ratio of depth of water to the volume of the piston assembly 10 should be preferably 2:1. It is preferable to install the present invention near the bottom where the volume of the water and the water pressure is the greatest. However the device may also be placed substantially close to the top of the water line, as long as the water line is high enough to flow into the piston opening 65 of the casing 60. It is also preferable to dispose the piston assembly 10 near a retaining wall 240 as shown, where it can serve as drainage or as a supplemental drainage system, to prevent water from wastefully splashing over the retaining wall 240. One skilled in the art will understand that this FIG. 1 and subsequent FIGS present a cross sectional cutout, where one of the sidewalls 50 and inner and outer walls 70 and 80 respectively, have been cut away to reveal the inner workings of the water piston assembly 10.

In the preferred embodiment, the water container 20 is the movable portion of the water piston assembly 10, whereas the casing 60 is the part that is securely immobilized within the base 260. There is no preferred means of immobilizing the casing 60 within the base 260, but some of the conventional examples are riveting, crimping, welding, soldering, brazing, taping, gluing, cementing, or through the use of various adhesives. The preferred volume of the casing 60 is between 2,000 and 4,000 cubic feet, with the preferred volume of the water container 20 is less than or greater then the volume of the casing 60. Additionally, the casing 60 is shown as mounted on top of the base 260. In an alternative embodiment, the casing top 94 is flush with the surface of the base 260 with only the piston assembly openings 65 visible at the top. The piston opening 65 is preferably between 10 and 20 feet/inches wide and between 15 and 30 feet/inches long, and may additionally contain a semi-permeable wire mesh that, depending on the grid density, can function to prevent the cylinder assembly from getting clogged up or to even serve as a filtering system. If the environment has the water flow to support it, the casing 60 really has no limit in the size, which in turn can create an unlimited amount of renewable energy.

Clearly visible in FIG. 1 is the inner wall 70 and the outer wall 80 which are linked at the casing top 92 and form a hollow gap 90 that is sized to fit the water container side wall 50. The water container or piston will fit perfectly between this space at top dead center. The water container 20 slides up and down or back and forth within the hollow gap 90. It is understood that the relief of the side wall 50 of the container 20 and of the outer wall 80 and the inner wall 70 of the casing 60 should be similar enough to permit an unobstructed sliding movement of the sidewall 50 within the hollow gap 90. It is preferred that material for the water piston assembly 10 is durable, inflexible and rust proof, and may be made out of stainless steel, aluminum, polyvinyl chloride a metallic alloy, wood ceramic, painted metal, steel alloy or concrete. All components may be manufactured out of the same material, but may be manufactured out of different materials.

Still referring to FIG. 1, the power transfer system 140 is composed of a connecting rod 150, which connects to the water container 20 via a pivot 155 at the first end 160, and to the crankshaft 180 at the second end 170. The crankshaft 180 is formed out of a plurality of crankpins 190 connecting a plurality of crank rods 200. The pivot 155 is essentially a bracket formed around a pin (not shown) that is commonly referred to in the art as the gudgeon pin that is attached to the crank rod 200. Either the pin or the bracket may be disposed at the bottom 40 of the water container 20. Using a connecting rod 150 that is pivotally connected to a water container 20 is well known and is easily enabled by one skilled in the art. The connecting rod 150 is preferably a solid segment of material with openings to connect to pins at first end 160 and second end 170. The preferred length of the connecting rod 150 is long enough to have the piston move freely, keeping in mind the greater the cam shaft throw, the greater the horsepower of the device and the more energy is being generated. The length will be dictated by a specific implementation or water body utilizing the present invention. One skilled in the art will appreciate that the capacity or the power of the present invention is directly proportional to the length or the throw of the connecting rod 150 and to the displacement of the water piston assembly 10. The connecting rod 150 will most likely endure a great deal of stress, particularly at the second end 170, where the connecting rod 150 connects to the crankpin 190. For that matter, it is imperative that connecting rod 150 be made of a strong but rust resistant material, such as, but not limited to, stainless steel, tungsten, or a steel alloy. The rust resistance is essential due to a perpetual exposure to water.

Still referring to FIG. 1, as the water container 20 begins its downward journey, the vents which may be cut outs in the piston may be about 18 inches in height and about 80% of the width of the piston. As the piston is coming down it will be engineered that no water flows out until bottom dead center when the exit ports 130 open and begin to drain. In an alternative embodiment the exit ports are placed on the side of the piston. Preferably, the exit ports 130 are calibrated in such a way that by the time the water container reaches the dead center low position, as shown, it is completely drained, and thus begins its upward stroke. The exit ports 130 preferably contain covers (not shown) that are opened with enough gravitational pressure from the water inside the water container 20. The exit ports 130 can also have a powered synchronized opening means and are used to drain the piston assembly 10. The water issuing from the exit ports 130 lands on the water exit facility 250, which is a sloping shoot or a shelf that then channels the water away from the invention. In one embodiment the water is channeled at speed toward an electricity producing turbine or to a transmission system that provides a mechanical enablement to various other apparatuses. At the dead center low position as shown, all the water has drained, and the container will begin its upward journey into the casing 60.

Figures 1A, 1B:
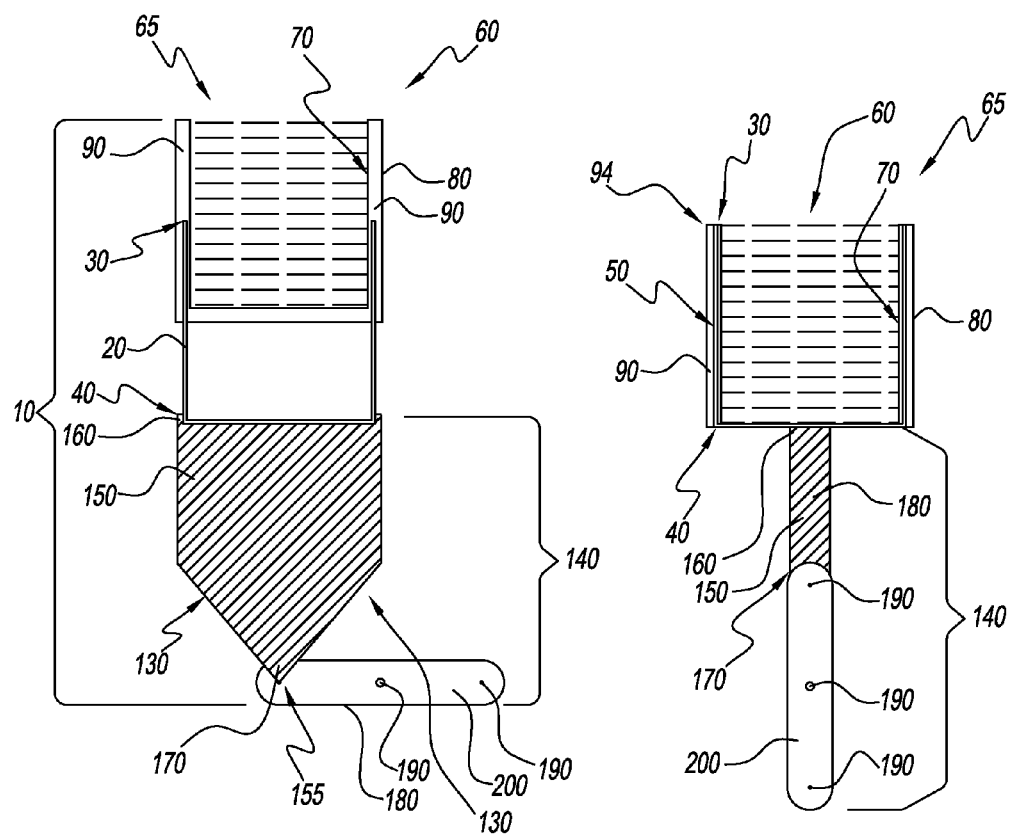
FIG. 1A shows a side view of an alternative embodiment of the water container section of the present invention.
FIG. 1B shows a side view of the preferred embodiment of the present invention, with the container having reached the dead center high position within its casing.

FIGS. 1A and 1B show an embodiment of the water piston assembly 10, with FIG. 1A showing an alternative embodiment of the connecting rod 150. Shown in these FIGS. are a single water piston assembly 10, a water container 20, a container top 30, a container bottom 40, a sidewall 50, a casing 60, a piston opening 65, an inner wall 70, an outer wall 80, a hollow space 90, a casing bottom 92, a casing top 94, a location of the exit ports 130, a power transfer system 140, a connecting rod 150, a pivot 155, a first end 160, a second end 170, a crank shaft 180, a crankpin 190, a main shaft 195, and a crank rod 200.

FIG. 1A shows an alternative embodiment of the connecting rod 150, appearing to have a substantially equal width as the container bottom 40 at the first end 160. This width may remain constant until terminating in a downward facing isosceles triangle, or substantially a 90° downward facing wedge, at the second end 170. The sloping section 157 of the connecting rod 150 can accommodate a greater number of exit openings 130, equally notable is the fact that discharging water at the bottom of the connecting rod 150, rather than at through the container bottom 40 reduces the splash effect due to the close proximity of the connecting rod 150 with the water's landing point on the water exit assembly 250. This is more efficient since less water gets splashed on the surrounding surfaces thus enhancing the velocity of the flow of water down the water exit assembly 250.

In FIG. 1A the pivot 155, preferably found on the first end 160 of the preferred embodiment, is not present. Therefore, the connector rod 150 will pivot together with the water container 20, which will now tilt to accommodate the throw motion of the connecting rod 150. Therefore, the hollow gap 90 should be made especially wide to permit a substantially free movement for the container top 30, as this component may need to also be able to tilt in either direction as water container 20 rises and falls in response to the through motions dictated by the crankshaft 180.

Another alternative embodiment of the present invention is to have a water container 20 that is capable of tipping over when full. Given the current diagramed configuration, such a tipping water container 20 would only be tipping partially with the container top 30 remaining within the hollow space 90 even during the tipping stage (not shown). Although this embodiment would call for a more elaborate water container 20, it would also cause the water to discharge more rapidly. This in turn would lead to a quicker water flow down the water exit assembly 250.

FIG. 1B shows the preferred embodiment of the connecting rod 150, with the water container 20 at the dead center high position. It is apparent from this diagram that the sidewall 50 has slidably advanced up the hollow space 90 until the container top 30 is immediately beneath the casing top 94. The next step would be for the doors 100 (FIG. 3) to open, which in this embodiment occurs with the help of an electrical motor (not shown). The doors 100 move in the upward direction either mechanically through the use of levers or pulleys (FIG. 4) or electronically, as when the sensor at the container bottom 40 or on the container sidewall 50 is activated when it comes in contact with the casing bottom 92, or whenever a sensor of this type is able to detect a dead center top location of the position of the doors 100. Once a sensor (not shown) is set off, an electrical motor (not shown) lifts the doors 100 into an open position against the inner wall 70. The power of such electric motor would depend on the water pressure inside the casing 60, which depends on the water depth of the water reservoir 5 and on the volume of water present within the casing 60.

Figure 2:
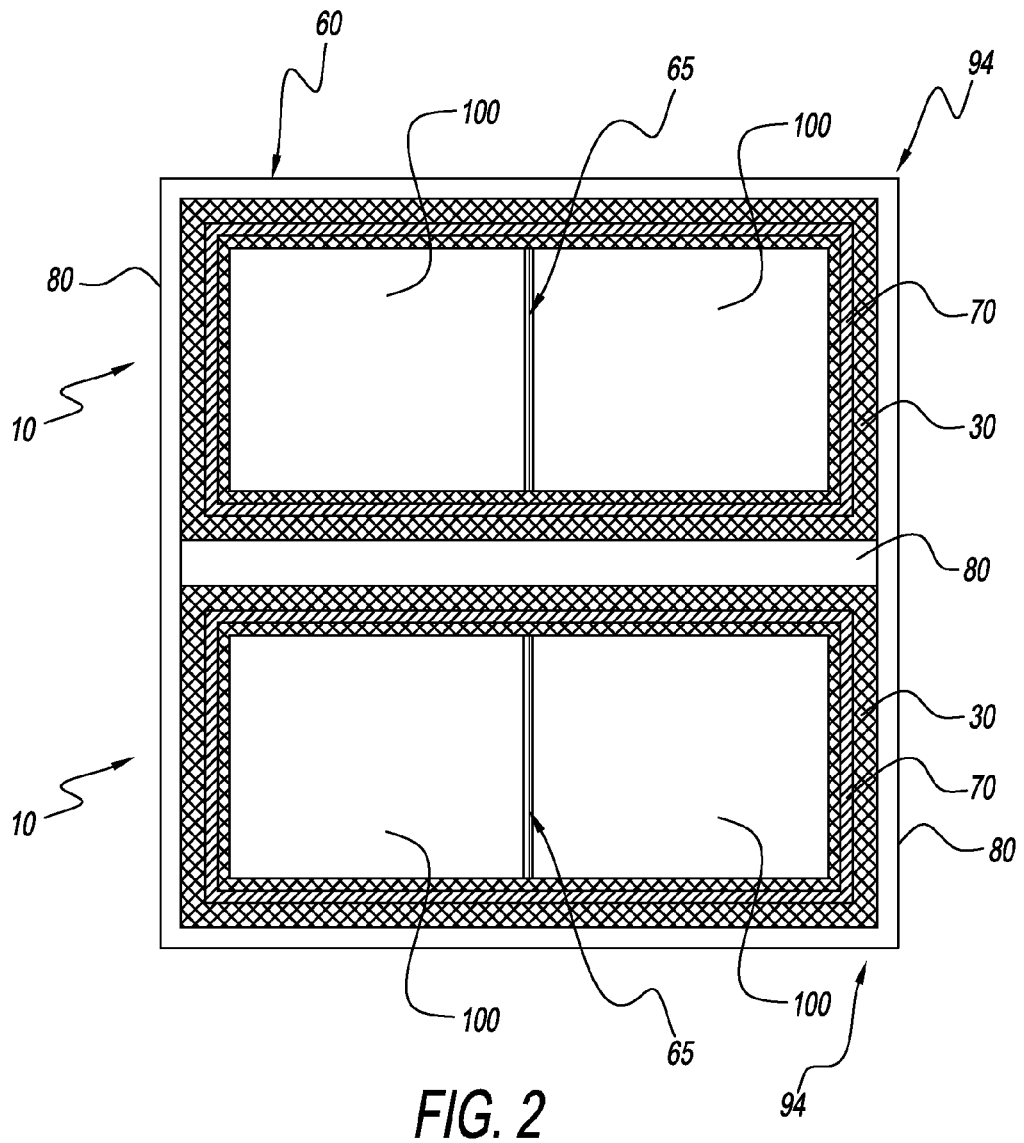
FIG. 2 shows a top view of an alternative embodiment of the present invention.

FIG. 2 shows the top view of an alternative embodiment of the present invention, in particular, visible is the top of the two reciprocating water piston assemblies 10. Shown are a container top 30, a casing top 94, inner walls 70, outer walls 80, and doors 100. This alternative embodiment shows a set of doors 100, disposed at the casing top 94. The doors are diagramed in a closed position, in a preferred twin section embodiment. A twin section embodiment of the doors 100 constitutes the claimed door system, which is the preferred embodiment since this makes the doors 100 smaller, lighter and more maneuverable. Additionally a twin section door 100 can admit and expel water at a greater rate than a single section embodiment. This diagram shows the outer wall 80 surrounding both of the water assemblies as well as in between them.

Alternatively FIG. 2 is a representation of a casing top 94 of a single water piston assembly 10. In this embodiment the doors 100 form a dual pair of twin panel doors 100. Note that the strip of outer wall 80 running in between the two pairs of doors 100, now becomes a cross beam across a piston opening 65. This segment of the outer wall 80 provides an additional support for the doors 100 as well as enhanced integrity for the rest of the water piston assembly 10. A dual pair door 100 configuration is applicable when the piston opening 65 is especially large, such as when the width is between 10 and 30 feet and the length is between 20 and 80 feet. A large opening 65 creates the need for bigger doors 100. However, to keep the doors maneuverable and the water flow rapid, the doors 100 should preferably remain small. Therefore utilizing several pairs of doors 100 for a single piston opening 65, as shown, is a viable compromise. A wide opening is also preferable when a certain capacity water piston assembly is required, while only a relatively shallow casing 60 and water container 20 may be used. In such a situation, a wider water piston assembly 10, with a larger opening 65 is preferable. An option may be to not have doors 100 at all, and for the entire water piston assembly 10 to move in reciprocal strokes, meaning, that doors 100 at the piston opening 65 are closed, the entire piston simply drops.

Figure 3:
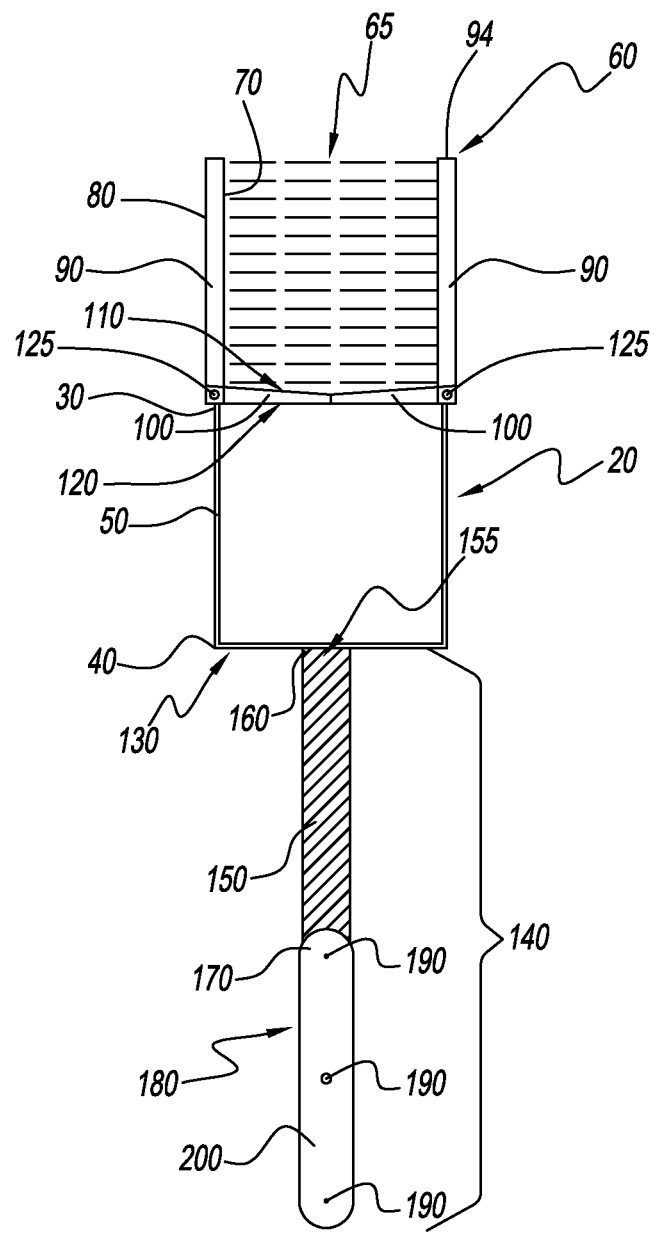
FIG. 3 teaches a side view of the preferred embodiment of the piston assembly.

FIG. 3 is another side view of the preferred embodiment of the present invention, with the water piston assembly in the dead center low position. Shown are a water piston assembly 10, a water container 20, a container top 30, a container bottom 40, a sidewall 50, a casing 60, a piston opening 65, an inner wall 70, an outer wall 80, a hollow space 90, a casing bottom 92, a casing top 94, a plurality of doors 100, an upper surface of the doors 110, a lower surface of the doors 120, the location of the exit ports 130, a power transfer system 140, a connecting rod 150, a pivot 155, a first end 160, a second end 170, a crank shaft 180, a crankpin 190, a main shaft 195, and a crank rod 200. The water has just discharged out of the exit ports 130 since the doors 100 are closed, the water container 20 is empty and the casing 65 is again filled with water. The preferable setup of water piston assembly is shown, with doors 100 disposed at the casing bottom 92. In this embodiment the hinges 125 of the doors 100 could contain an electric motor, which could be activated when a sensor or a system of sensors detects that the water container 20 has advanced upward within the hollow gap 90 to an optimal position for a given operation. Alternatively, the doors could be activated by a mechanical mechanism.

The detection mechanism can be accomplished with a simple circuit breaker wire connector, where the container top 30 has a metal plate that completes a circuit when the water container 20 is at a predetermined desired position for such operation. This may be accomplished by having a section of current conducting material disposed on the sidewall 50. The current conducting material is engaged as the water connector 20 advances upward within the hollow gap 90, causing the current conducting segment to come in contact with two ends of exposed wiring that are connected in a circuit to a power supply (not shown). The power supply may be a battery, a current feed from a generator or from a conventional power supply grid. The location of the current conducting material is calibrated so that when the water container 20 is an optimal position, the current conducting segment is linking the two wires, thus completing an electric circuit and enabling the flow of current. The same circuit that enables the detection mechanism can also supply power to the electric motor (not shown) within the hinges 125, either directly or through a safety switch, or a circuit breaker. Once the doors 100 open, the water container 20 gradually becomes heavier due to an influx of water and begins to move downward. The current conducting segment eventually moves away from the two ends of a wire and breaks the circuit, thus cutting power to the electric motors power the doors 100. This forces the doors 100 to close under the weight of new water that has entered the casing 60 and under the weight of the water above the piston opening 65 that is exerting pressure on the upper surface of the doors 110.

Alternatively, the doors 100 can be enabled through mechanical means by a system of pulleys and levers. The same motion of the sidewall 50 of the water container 20 within a hollow gap 90 would engage the hinges 125 for the doors 100 by means of a pinion gear, cable around a pulley or worm drive.

A probable pinion mechanism would work by having a segment of an annular gear (not shown) disposed on the sidewall 50, on the side facing the hinges 125. The annular gear would engage a pinion gear (not shown), which would in turn engage the pinion mechanism on the hinges 125. In this configuration when an annular gear moves upward and engages a pinion gear, the pinion gear will turn in a clockwise direction. The pinion gear on the hinge 125, that is engaged by the pinion gear presently turning in a clockwise direction, will be begin turning in a counter clockwise direction, thus opening the doors 100. The process of closing the doors is precisely the same, except that now the annular gear is moving downwards, a pinion gear is turning counter clockwise, and the pinion gear on the hinge 125 is turning clockwise, closing the doors. One skilled in the art will understand that this pinion mechanism description is true, if the pinion gear is engaged by the annular gear on the left side, to operate a left side section of door 100. When the annular gear engages the pinion gear on the right side the process is the same but in a reverse order to that of the left, namely, as annular gear moves upward, the right side engaged pinion gear turns counterclockwise, turning the pinion gear on the hinges 125 in a clockwise direction to open the right side section of the door 100, and in reverse order to close.

A similar setup of worm gears would enable the operation the doors 100. The worm gears tend to be less efficient than spur gears, but are also more compact and self-locking. Due to this difference, a larger embodiment of the present invention will likely use spur gearing, whereas, a worm wheel mechanism will be preferred in more compact embodiments, or when the water pressure inside the casing 60 is especially high.

Alternatively, a "cable around a pulley" mechanism may be used to enable the operation of doors 100. The likely function will be similar to the gear drive described above. A cable (not shown) is connected to the sidewall 50. This cable is turned around the lower pulley (not shown), and then around the top of the upper pulley (not shown), which may be the hinge 25 or a separate pulley. The second pulley may be slightly offset from the vertical axis of the lower pulley, but does not need to be. Due to the potential size of this mechanism, the cable and pulley arrangement may need to be implemented outside the outer wall 80. As the sidewall 50 slides upward, the cable is pulled downwards between the pulleys, thereby forcing the doors 100 to open. As the water container 20 sinks, the sidewall 50 slides downwards, the cable between the pulleys slackens. At some point the force of gravity coupled with the weight of the water on the upper surface of the doors 110 is greater than the pulling force of the cable, thereby forcing the doors 100 to close.

As an aside, it needs to be mentioned that the outer wall 80 is not strictly necessary, and the sidewall 50 can alternatively form an advancing and retreating jacket around the inner wall 70, which will also function as guide for the sidewall 50.

Another alternative embodiment compatible with FIG. 3 is for the water container 20 to have a second set of doors (not shown) disposed at the casing top 94. In this embodiment both the doors 100 at the casing top 94, and the doors 100 at the casing bottom 92 will be swinging downward in the direction of the water container 20. The doors 100 at the casing top 94 would have a lever mechanism (not shown), similar to a gear mechanism that was described above, and which would be engaged within the hollow space 90 by the rising container top 30 and would gradually force the doors at casing top 94 into a shut position. An important enabling feature is that the water container 20 is moving upward at a substantially rapid rate, as will be seen in FIGS. 4 and 5, since it is being propelled by the motion of another water container assembly 10 that is disposed on the same crankshaft 180 at 180° angle from the water piston assembly diagramed in the present figure; and as that other water piston assembly 10 is filled with water, it is moving downwards to discharge the water, propelling the water container assembly 10 in present FIG upwards. The rapid rate of motion of the container top 30 provides sufficient velocity to shut the doors 100 at the casing top 94. Additionally, the torque generated by the closing of the upper doors 100 creates pressure within the casing 60. This pressure is also exerted on the upper surface of the doors 110, thereby forcing the second set of doors 100 at the casing bottom 92 to open, releasing the water into the water container 20. This flow of water forces the water container 20 to sink under the increased weight of the entering water. As the container top 30 moves downward the lower doors 100 close and the upper doors 100 reopen, either with the motion of the sidewall 50 that is engaging a pinion gear, worm drive or pulleys with the workings of an electrical motor (not shown). Alternatively, the lower and the upper doors 100 may both be opening upwards, towards the piston opening 65 or each in a separate direction.

Figure 4:
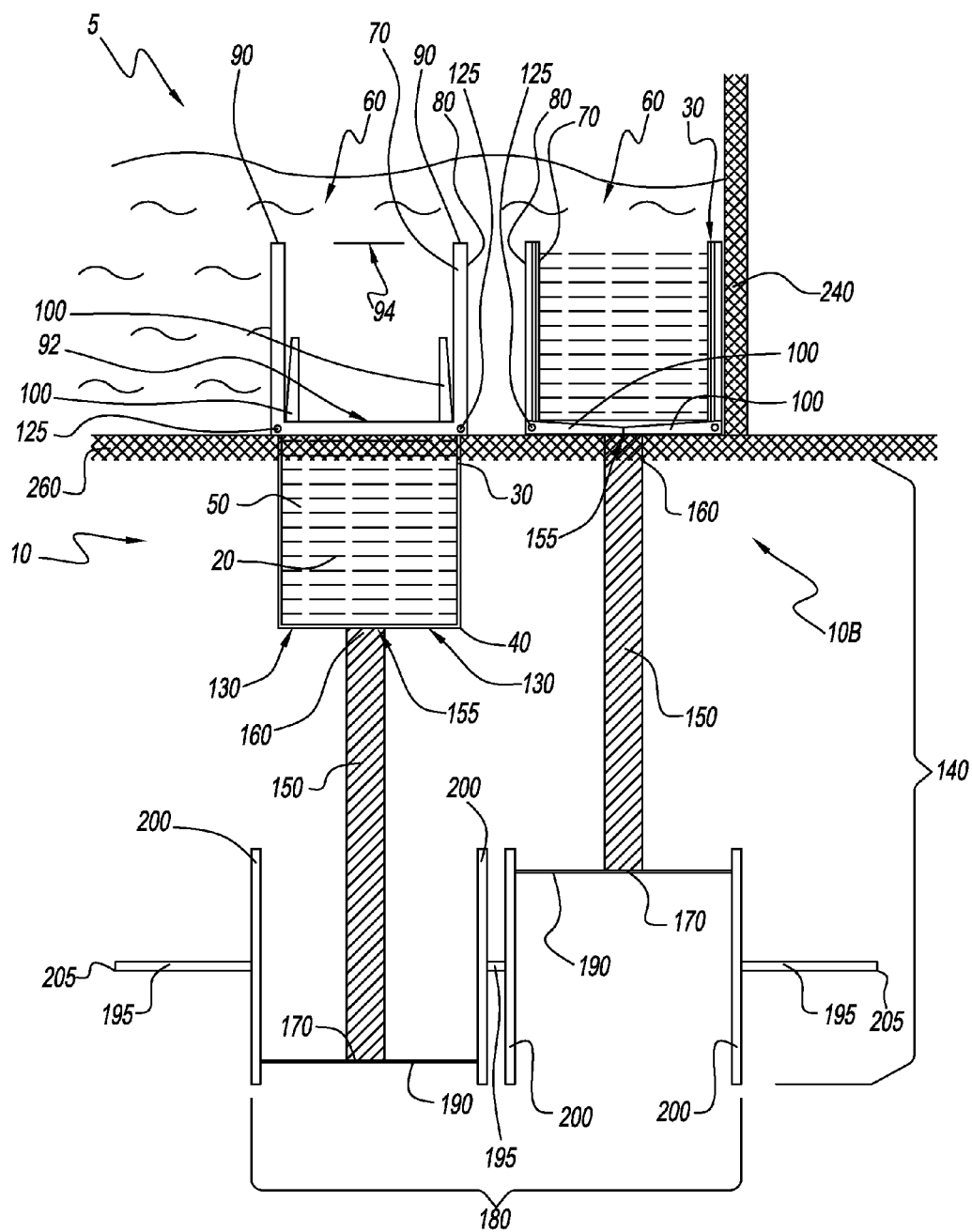
FIG. 4 shows a front view of the preferred embodiment of the present invention, disclosing the reciprocal operation of the containers within the piston assembly.

FIG. 4 is a diagram of the preferred assembly of the present invention. Shown are a reservoir 5, a pair of water piston assemblies 10; which for clarity are shown as a water piston assembly 10A and a water piston assembly 10B; a water container 20, a container top 30, a container bottom 40, sidewalls 50, a pair of casings 60, a pair of piston openings 65, inner walls 70, outer walls 80, hollow spaces 90, a casing bottom 92, a casing top 94, a plurality of doors 100, an upper surface of the doors 110, a lower surface of the doors 120, a preferred location of the exit ports 130, a pair of power transfer systems 140, connecting rods 150, pivots 155, a pair first ends 160, a pair of second ends 170, a crankshaft 180, crankpins 190, a main shaft 195, crank rods 200, bearing ends 205, a retaining wall 240, and a base 260. In an alternate form of the invention, the water container 20 may have vents (not shown) disposed near the top of container top 30 and container bottom 40, as well as cone shaped cover not shown. Water can pour into the top vents, then exit at the vents located near container bottom 40.

The crankshaft 180 of the power transfer system 140 is responsible for linking the two water piston assemblies 10A and 10B, which are exactly alike and shown in a reciprocal configuration that is phased apart at 180° due to the arrangement of the crank rods 200, also known in the art as crank throws. Each connecting rod 150 is connected via pivot 155, which may be a piston pin, gudgeon pin or a wrist pin (none shown), to the container bottom 40 on the first end 160. The second end 170 connects to the crankpin 190, also known in the art as a crank journal. Water tight bearing or lubrication rings will likely be used in both the first end 160 and in second end 170. The greatest strain is borne by the second end 170 and the crankpin 190, so that a bearing ring is most preferable to be disposed on that end. The crank rods 200 create the pulling and the pushing force that is powered by the weight of water inside the water containers 20, coupled with a force of gravity. Each pair of crank rods 200 frames a crankpin 190, and each crank rod 200 and crankpin 190 combination is connected to the main shaft 195. The bearing ends 205 of the main shaft 195 rotate inside bearing rings (not shown) of a fixating structure (not shown). Such a structure would immobilize the crankshaft 180 and only permit axial rotational movement of the main shaft 195. The main shaft 195 is not a single shaft that runs the length of the crankshaft 180, but is rather a series of segments that link the crank rods 200 together.

Alternatively, the bearing ends 205 may be connected through a series of gears to supplemental shafts, thus forming a transmission of hydropower into a mechanical power to enable mechanized processes to occur (not shown), or to a be converted into electrical power by a direct connection to an electrical generator (not shown).

It should be noted that the emphasis is on an efficient and powerful device. Therefore, it may be preferred to limit the maximum size of the present invention only by the space available within a body of water where the present invention is installed, and by the volume and depth of water within this body. One skilled in the art will understand that some components of the power transfer system 140 may become impractical or unnecessary based on size, the overall concept of reciprocating water piston assemblies 10 will always remain true.

Depending on the size of the crankshaft 180 and on its revolutions, there may be a need to add counterweights to the crank rods 200, to limit the stress on the crankpins 190 and on the bearing ends 205. A crankshaft needs to be especially strong and is therefore commonly made out of metal, stainless steal, vanadium, micro-alloyed steel or any strong but rust resistant material. A crankshaft 180 may be assembled from several components as shown, or may be monolithic segment that is either forged or machined from a single steel bar or cast from a mold.

An alternative power transfer system 140 may be in the form of pinion gear, cable around a pulley or worm drive. The pinion gear embodiment is described in FIG. 6. One embodiment of a system employing a cable around a pulley is to have an upper pulley block (not shown) disposed above the casing top 94, which a lower pulley block (not shown) disposed at a distance below the base 260. The upper and lower pulley blocks will be located between the two water piston assemblies 10. A cable is then threaded over the top of the upper pulley block, and into an opening in the casing top 94, and then connected to the container top 30. The cable is then threaded around the bottom of the lower pulley and up to the container top 30 of the second water piston assembly 10 and finally terminate at the top of the upper pulley block. It is preferred that such a cable is a continuous loop, but may in form of separate segments connecting the water container 20 to the lower or upper pulley block. Yet another alternative is to use just the upper pulley. Regardless of the number of pulleys used, the water container 20 of two water neighboring water piston assemblies 10 will necessarily need to be connected together, so that when one water container 20 sinks when filled, it will pull the other empty water container 20 upwards to be refilled, which will in turn sink, pulling the now drained first water container 20 upwards, thus completing the see-saw motion of the present invention, which will continue until all the water is drained below the enabling volume. Note that some stopping mechanism will need to be implemented to prevent the water containers 20 from sinking below a desired point.

One worm drive alternative embodiment of the power transfer system 140 would have two water piston assemblies 10 that are disposed next to one another, have one connecting rod 150, and each connecting rod 150 have an annular gear that engages a single or a combination of spur or worm gears disposed on a support structure (not shown) in between the two piston assemblies. The reciprocating motion of the water piston assemblies 10 would be communicated through gear communication and the operation of the water cylinders would otherwise function as described above or in FIG. 4

The entire present invention is set into motion by the presence of sufficient amount of water in the reservoir 5. In FIG. 4 the invention is shown with one set of doors 100 as opened in the water piston assembly 10A and the other set of doors 100 closed in the water piston assembly 10B. The water container 20 of the water piston assembly 10A is filled with water, making it heavier than the water container 20 of the water piston assembly 10B. It is obvious to one skilled in the art that the full water container 20 presses downwards on the crankpin 190 with greater force than the empty water container 20, causing the crank rod 200 to swing or throw in the direction parallel to the axis of the pressure. This swinging or throwing motion also causes the crankpin 190 beneath the empty water container 20 of the water piston assembly 10B to swing in the opposite direction due to the 180° offset of the crank rods 200. This swing propels the water container 20 that is on top of the connecting rod 150, of the water piston assembly 10B, upwards into the hollow gap 90. When a water container 20 of the water piston assembly 10A reaches substantially dead center low position, the exit ports 135 are opened, and the doors 100 are closed. This causes the water piston assembly 10B to drain completely. At the same time, the doors 100 in the water piston assembly 10B open, and exit ports 130 close. As the water container 20 of the water piston assembly 10B swings fills up, and the water container 20 of the water container assembly 10A empties, the downward pressure becomes greater beneath the water container 20 of the water piston assembly 10B. Thus the cycle is reversed.

It should be noted that the present invention will continue to function as long as the water inside the reservoir 5 remains above a certain volume, preferably between 75 cfps and 100 cfps. Alternatively, the reciprocal motion of the present invention can be supplement by a separate motor (not shown), connected to one or both of the bearing ends 205. As such, the present invention will also function as a drain, since it will be able to channel water out of the reservoir 5 as long as the water level remains above the casing top 94, which may be at the base 260 of the reservoir 5, if the casing 60 is submerged (not shown) as in an alternative embodiment.

Still referring to FIG. 4 the water ports 130 are apertures that remain covered until opened at or close to the dead center low point of the motion of the water container 20. The covering may be opened and closed through an electrical motor. The motor can be activated when a segment of an electrical current conducting material disposed on the sidewall 50. The segment of an electrical current conducting material would come in contact with exposed ends of wires at the casing bottom 92, which completes a circuit, as the water container 20 moves downward toward the dead center low position. The exposed wires at casing bottom 92 are connected to a power source. Therefore, as soon as the circuit is complete, the current begins providing power to motors operating the coverings (not shown) of the exit ports 130. Alternatively, the crankshaft 180 may be connected to the covers that cover the exit port 130 through a pulley and a belt drive mechanism (not shown) or a series of spur gears that would synchronize the opening and the closing of the exit port covers (not shown) to the motion of the crankshaft 180.

Figure 5:
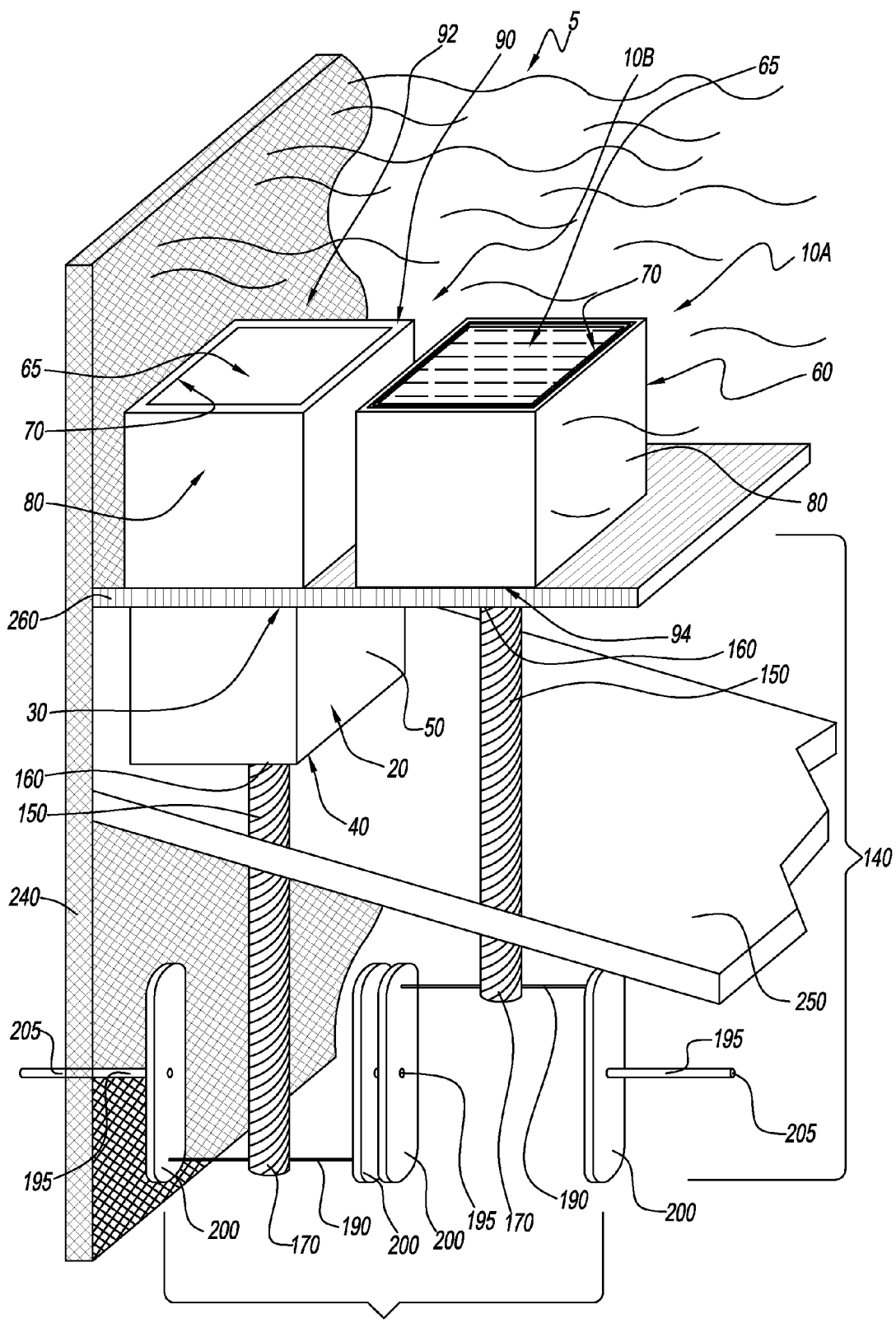
FIG. 5 shows a perspective view of the preferred embodiment of the present invention, showing the operation of the cylinder casing and the water exit assembly.

Still referring to FIG. 4, the water piston assembly 10B is positioned at the base 260, and right next to the retaining wall 240. Close positioning to the retaining wall 240 is preferable as the invention may serve as a supplemental drainage device to prevent water from pilling over the retaining wall 240. Additionally, the retaining wall functions as a fixating structure for the bearing end 205, as shown in FIG. 5. The exact proximity of a water piston assembly 10 with respect to the retaining wall 240 is not critical for the enablement of the present invention.

It is worth noting that one skilled in the art will appreciate that the reciprocating force of the water piston assemblies 10A and 10B is converted into rotational mechanical energy by the crankshaft 180 which itself can be connected to an electrical energy when connected directly to an electric generator.

FIG. 5 is a perspective diagram of the preferred assembly of the present invention. Shown are a reservoir 5; a water piston assembly 10A and a water piston assembly 10B, which are mirror images of each other; a water container 20; a container top 30; a container bottom 40; a sidewall 50; a casing 60; a piston opening 65; an inner wall 70; an outer wall 80; a casing bottom 92; a casing top 94; a power transfer system 140, a connecting rod 150, a first end 160, a second end 170, a crank shaft 180, several crankpins 190, a main shaft 195, crank rods 200, bearing ends 205, a retaining wall 240, a water exit assembly 250, and a base 260. One skilled in the art will understand that the retaining wall 240, the base 260 and the water exit assembly 250 can be manufactured out of metal, concrete, asphalt, rock, ceramic, polymer or wood, or any other construction material commonly used in the art for this purpose. The base 260 can be any kind of a bottom surface, such as, but not limited to, a man-made material of a reservoir 5, or a river bed. The water exit assembly 250 is preferably wider than the overall width of the water piston assemblies 10A and 10B, to ensure that all water captured by the water piston assemblies remains within the confines of the water exit assembly 250 instead of washing of its sides. The casing 60 and the water container 20 are shown as preferably substantially square, but may be in any shape, such as elliptical or circular.

The water exit assembly 250 is shown as substantially flat, preferably having grooves or channels to direct water to an electric generator, a paddle wheel or an impulse turbine all of which convert the kinetic energy of the water flow to a of a paddle or a turbine, which is then converted to an electrical energy by an electrical generator. The water exit assembly 250 may be in the shape of a gutter, a water shoot, a pipe or a flat surface that may or may not contain directional elements.

The present invention may be installed into the bed of a natural or existing man-made waterway. If that is the case, the area below the base 260, which represents a river bed or a bed of the man-made waterway, may be excavated to provide sufficient height and width clearance for the motion of the water cylinder 20, the power transfer system 140, and the water exit assembly 250. Once the device is installed into the excavated pit, the excavated area may be sealed to water from the reservoir 5. Alternatively, if possible, the entire assembly, having a retaining wall 260, a base 260 and water exist system 250, along with all the other preferred components may be installed onto an existent river bed or bottom of a reservoir 5. However, the area below the base 260 may be made free of water and the retaining wall 240 should preferably be above the existing surface of the water.

Figure 6:
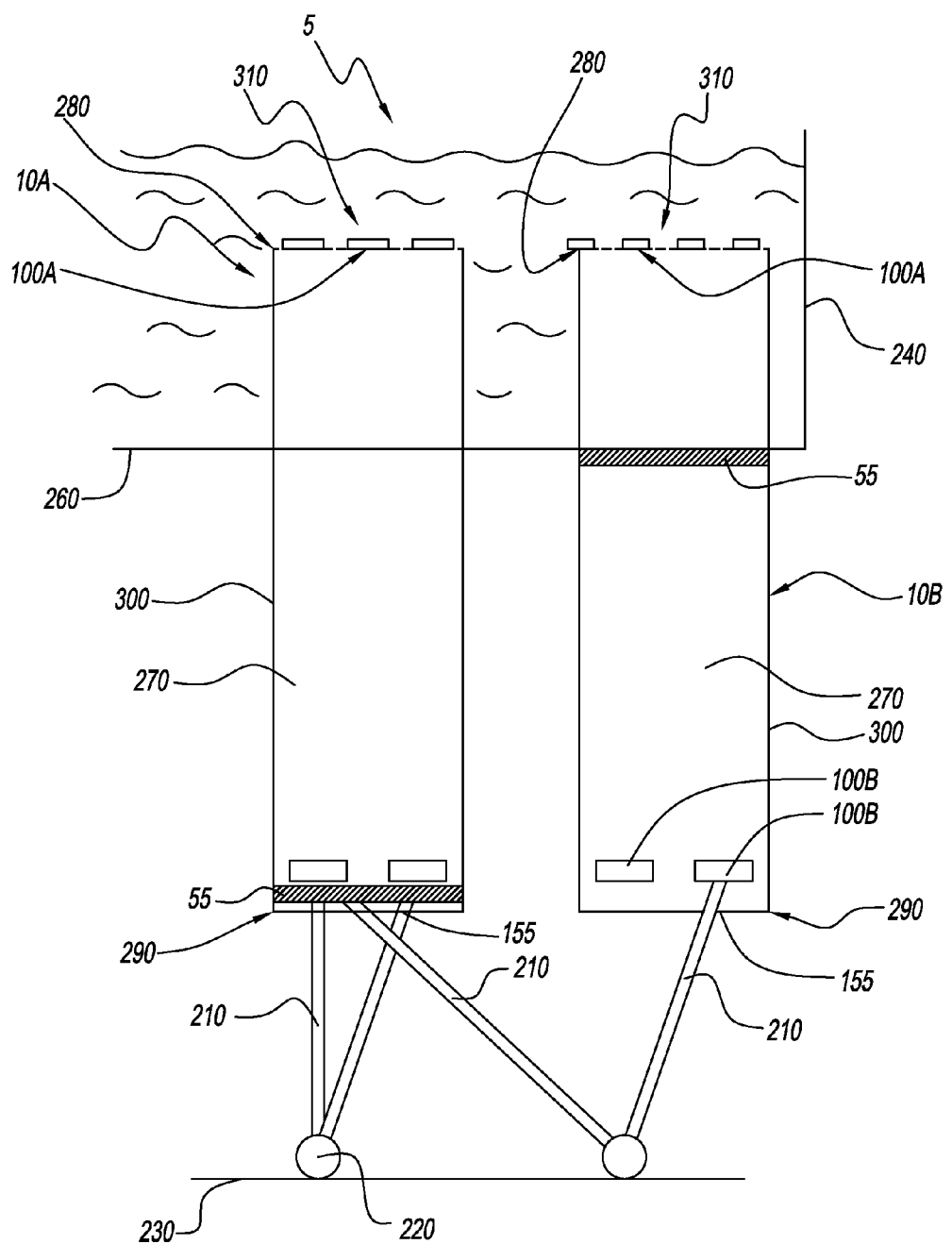
FIG. 6 shows an alternative embodiment of the present invention with the water container being supported by a rocker arm and pinion wheel combination.

FIG. 6 is an alternative embodiment of the present invention, which uses a piston slidably moving within a cylinder instead of the preferred water container and casing. Shown are a reservoir 5; for clarity a water piston assembly 10 is shown as a water piston assembly 10A and a water piston assembly 10B, which are mirror images of each other; a piston 55; a first door system 100A; a second door system 100B; a power transfer system 140, a rocker arm 210, a pinion wheel 220, a annular support 230, a retaining wall 240, a base 260, a cylinder 270, a cylinder top 280, a cylinder bottom 290, a cylinder sidewall 300, and a cylinder opening 310.

In this embodiment the cylinder 270 has been immobilized within the base 260, essentially becoming a conventional cylinder. The motion inducement is still being supplied by the gravitational force coupled with the weight of a particular volume of water that is situated above the opening 310 of this alternative embodiment of the present invention. The volume of water may be somewhat less then the required volume of water in the preferred embodiment, since the piston 55 is often, but not always, lighter than the water container 20. The water enters the cylinder 270 of the empty water piston assembly 10A through the first door system 100A, which is currently open. The water begins to exert downward pressure on the piston 55, which begins to retreat in a downward direction. This downward motion of the piston generates suction forces, further inducing an inflow of water into the cylinder 270.

FIG. 6 shows an alternative embodiment of a power transfer system 140. The piston 55 is attached to the rocker arm 210 with a pivot 155, which may be a piston pin, a gudgeon pin or a wrist pin (none shown) as in the preferred embodiment. The rocker arm 210 is attached to an axle (not shown) having a pinion wheel 220 on both ends. The pinion wheels 220 travel laterally along an annular support 230. A second rocker arm 210 is attached to the pivot 155 that is attached to the piston 55 of the water piston assembly 10B via the pivot 155. The preferred length of the rocker arms 210 is between 30 and 100 feet, while its preferred thickness is between 6 inches and 18 inches. Note that depending on the embodiment implemented, the rocker arms 210 may be of a different length; a concept referred to in the art as master and slave rocker arm configuration. Preferably, however, the power transfer system 140 is a standard crankshaft 180, crankpins 190, a main shaft 195, crank rods 200, and bearing ends 205 as is disclosed in the previous Figures. One skilled in the art will also be able to appreciate that the rocker arm alternative embodiment disclosed in FIG. 6, may also be used with the preferred embodiment of the present invention.

The power transfer system 140 is preferably linked to an energy generation device or like a generator or a turbine, or to an energy dispersion device such as a transmission system that may have a gear mechanism or a cable and pulley mechanism, or a shaft and belt mechanism. It is preferable that in the present invention the power transfer system 140 is linked to a generator that generates electricity. The likely means by which electricity may be produced by some of the simpler generators may be for a bearing end 205 to be coupled, either directly or indirectly, to an armature loop located between two magnets (not shown). The rotation of the armature loop within a constant magnetic field would cause an electromagnetic force to be present in a circuit connected to such generator. Alternatively, the power transfer system may provide the mechanical energy to a turbine, which may be part of an electrical energy generator device. Those skilled in the art will appreciate the fact that the present invention provides a steady and reliable source of mechanical energy and that there are multiple ways in which the mechanical energy may into electrical energy.

Alternatively the mechanical energy created by the present invention, in particular, by the power transfer system 140, may be dispersed, and used to drive various mechanical devices. This dispersion may be accomplished by connecting one or both of the bearing ends 205 of the present invention to a transfer mechanism having a series of interconnecting spur or worm gears, which then connect to a device needing power, such as factory equipment, conveyer belts, air pumps an any other similar adaptation. As the crankshaft 180 would spin, it would also set in motion any gears connecting to it and any equipment connecting it directly or to gears.

A pulley and cable system or a shaft and belt system, will most likely work in substantially similar fashion, except that the gears would be replaced by a pulley wheel or wheels, or by a shaft. The spinning of the crankshaft 180 of the power system 140 would cause the spinning of a pulley system or a shaft system, which in turn would pull belts or cabling attached to such systems and would also provide mechanical power to devices connecting to such belts or cabling. Alternatively, the mechanical energy produced by the power transfer system 140 of the present invention may be embodied within a spinning pinion wheel 220 with the rocker arm 210 or within a mechanism of cable with pulleys or a combination of interconnected gears.

Still referring to FIG. 6, the second door system 100B is located in the sidewall 300 of the cylinder 270. Exit ports 130 are not used in this embodiment since they would be blocked and rendered useless by the piston 55. A small exit port 130 may be included however, but solely for draining access moisture out of the cylinder 270 that may collect below the piston 55.

Once the piston 55 passes the second door system 100B, it causes the second door system 100B to open and the first door system 100A to close, thus expelling the water within the cylinder 270. Once the cylinder 270 of the water piston assembly 10 is empty the pressure exerted on the power transfer system 140 by the piston 55 in the water piston assembly 10B becomes greater, causing piston 55 in the water piston assembly 10B to fall and the piston in the water piston assembly 10A to rise. Thus the process repeats itself until the water level falls below the required amount necessary to create sufficient pressure within the cylinders 270 to drive the power transfer system 140. The second door system 100B discharges water unto a water exit assembly (not shown) that is similar to the water exit assembly 250 disclosed in the preferred embodiment of the present invention. All other components not altered in this embodiment also remain the same. The water may be channeled into a turbine or a generator to create an electrical current.

The first door system 100A and the second door system 100B are enabled through motion of the piston 55. One simple device to control the first and second door systems 100A and 100B can be two independent or interlinked levers that either open or close as the piston 55 moves along the cylinder 270. As the piston 55 moves up, it engages a lever controlling the second door system 100B, causing it to close. As the piston 55 continues to rise, it trips a second lever to open the first door system 100A. This second lever may have a part that can only be engaged when the piston 55 gets closer to the bottom 290, to prevent the first door system 100A from closing too early. Alternatively, a lever at the bottom of the cylinder 270 may contain a single lever that is engaged with the downward pressure of the cylinder and causes the first door system 100A to close and the second door system 100B to open. This lever is released, when the piston 55 begins to move upward, closing the second door system 100B and opening the first door system 100A. However, to enable such a lever, the first door system 100A will additionally need to be spring-loaded to remain in a shut position when a the lever is released and the first door system 100A will need to spring-loaded to remain in an open position when this lever is release. These are just several enabling structures and there may other ways to enable the coordinated operation of the first and second door systems 100A and 100B.

Figure 7:
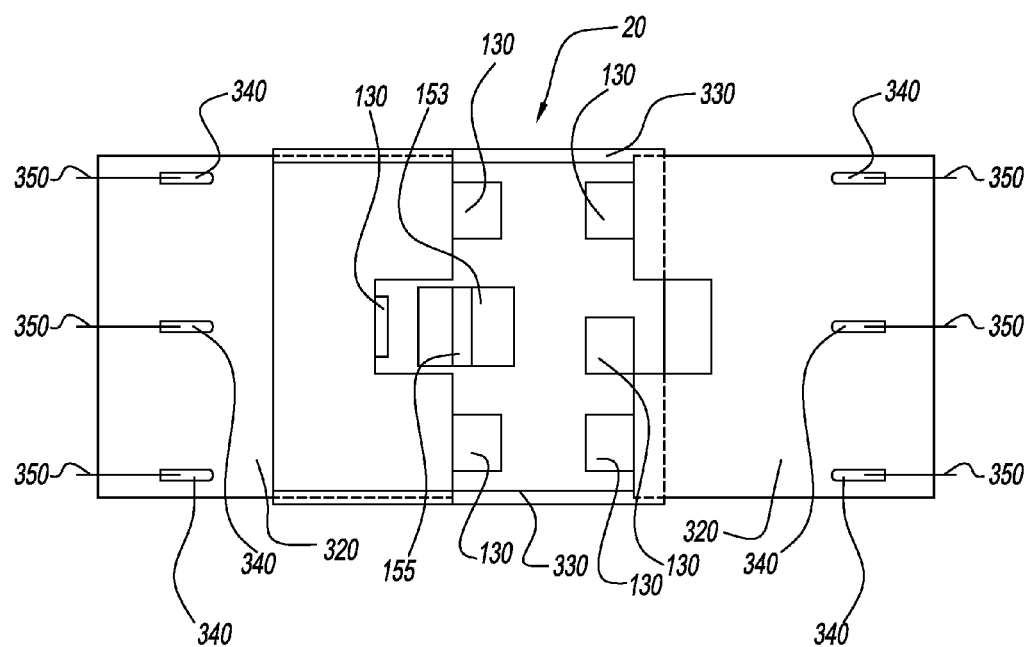
FIG. 7 shows a bottom of one of the water containers used in the preferred embodiment of the present invention.

FIG. 7 is a diagram of the container bottom 40. Shown in this figure is a water container 20, a container bottom 40, exit ports 130, a pivot recess 153, a pivot 155, a pair of covers 320, cover rails 330, a plurality of cover fasteners 340, and a plurality of cover cables 350. Shown is a square container bottom 40, which may also be round, oval, or shaped as a wedge. The shape of the container bottom 40 dictates the shape of the covers 320. The covers 320 are shown as curtain covers that cover the exit ports 130 like a blanket. Alternatively, each exit port 130 will have it own cover 320. The cover 320 is preferably thin to reduce weight and water tight to prevent wasteful leakage. The cover 320 slides within the cover rails 330. The cover 320 is moves apart when pulled by cover cables 350 that are fastened to cover fasteners 340. The cover cables 350 may be wires that power an electric motor (not shown), which operates the cover 320. in the embodiment shown, the covers 320 are spring loaded (not shown), the spring will prevent the cover 320 from detaching from the container bottom 40, and will also force the covers back into place over the exit ports 130 once the cover cables 350 slacken. The cover cables 350 are made from a strong but elastic material that is rust resistant, such as, but not limited to, steel alloys, or synthetic fiber made of polymer or grass. One skilled in the art will appreciate that the exit ports 130, shown as a series of portals or openings, may instead form one large opening or a many slits or openings forming a grill like structure. The recess 153, houses the pivot 155, shown here as a pin. The cover 320 contains a cutout to accommodate the connecting rod 150 (not shown in this figure).

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. An apparatus, suitable for generating energy in a aquatic environment, comprising:
    a power transfer linkage;
    at least two water piston assemblies connected to the power transfer linkage, each water piston assembly having:
        a casing immobilized on a base, the casing having an inner wall and outer wall linked at the casing top, forming a hollow gap between the inner and outer walls,
        the casing having an opening, suitable to receive water,
        the casing further having a bottom, the bottom having a door system to allow water into a water container;
    the water container also having a side wall and a bottom,
        the side wall of the water container slidably fitting between the inner wall and outer wall of the casing within the space formed by the hollow gap;
        the water container bottom having openable ports which allow water to drain from the water container to a water exit assembly;
    wherein when said casing door system is open water flows into said water container, moving said water container in a downward path while simultaneously pushing the water container from the other piston assembly in an upward direction, moving the power transfer linkage in a manner to create power.

2. The apparatus of claim 1, wherein the power transfer linkage comprises a rod having a first end connected to the bottom of the water container, and a second end of the rod is connected to a crank shaft.

3. The apparatus of claim 1, wherein the power transfer linkage comprises a rocker arm assembly.

4. The apparatus of claim 1, wherein the power transfer linkage comprises a pinion gear.

5. The apparatus of claim 1, wherein the apparatus is located in proximity to a retaining wall in an aquatic environment.

6. The apparatus of claim 1, wherein the water container can spill over.

7. The apparatus of claim 1, wherein the water container and casing are round or rectangular in shape.

8. The apparatus of claim 1, wherein the power transfer linkage transfers energy to a transmission assembly.

9. The apparatus of claim 1, wherein the power transfer linkage transfers energy to a generator.

10. The apparatus of claim 1, wherein said door system is closed when said ports are open, and wherein said ports are closed when said door system is open.

* * * * *